United States Patent
Endres et al.

(10) Patent No.: US 10,970,542 B2
(45) Date of Patent: Apr. 6, 2021

(54) SCALABLE THREE DIMENSIONAL OBJECT SEGMENTATION

(71) Applicant: HERE Global B.V., Eindhoven (NL)

(72) Inventors: Ian Endres, Naperville, IL (US); Shubhabrata Roy, Geldrop (NL)

(73) Assignee: HERE Global B.V., Eindhoven (NL)

( * ) Notice: Subject to any disclaimer, the term of this patent is extended or adjusted under 35 U.S.C. 154(b) by 75 days.

(21) Appl. No.: 16/283,180

(22) Filed: Feb. 22, 2019

(65) Prior Publication Data
US 2020/0272816 A1    Aug. 27, 2020

(51) Int. Cl.
| | |
|---|---|
| *G06T 7/60* | (2017.01) |
| *G06K 9/00* | (2006.01) |
| *G06T 7/11* | (2017.01) |
| *G06T 7/143* | (2017.01) |
| *G06K 9/62* | (2006.01) |
| *G05D 1/10* | (2006.01) |

(52) U.S. Cl.
CPC ......... *G06K 9/00637* (2013.01); *G05D 1/101* (2013.01); *G06K 9/6218* (2013.01); *G06T 7/11* (2017.01); *G06T 7/143* (2017.01); *G06T 7/60* (2013.01); *G06T 2207/10028* (2013.01); *G06T 2207/10032* (2013.01); *G06T 2207/20076* (2013.01); *G06T 2207/20084* (2013.01); *G06T 2207/30184* (2013.01)

(58) Field of Classification Search
CPC combination set(s) only.
See application file for complete search history.

(56) References Cited

U.S. PATENT DOCUMENTS

| | | |
|---|---|---|
| 8,488,877 B1 | 7/2013 | Owechko |
| 8,818,031 B1 | 8/2014 | Kelly |
| 9,488,492 B2 | 11/2016 | Samarasekera |
| (Continued) | | |

FOREIGN PATENT DOCUMENTS

| | | |
|---|---|---|
| WO | WO2018017793 A1 | 1/2018 |

OTHER PUBLICATIONS

Fukano, K., and H. Masuda "Detection and Classification of Pole-Like Objects from Mobile Mappin Data." ISPRS Annals of Photogrammetry, Remote Sensing & Spatial Information Sciences 2, Aug. 2015. (pp. 57-64).

(Continued)

*Primary Examiner* — Cindy Trandai
(74) *Attorney, Agent, or Firm* — Lempia Summerfield Katz LLC

(57) ABSTRACT

Segmentation of three dimensional objects may be implemented using a neural network model, a clustering module, a factorization module, and a geometric fitting module. The neural network model is configured to analyze point cloud data for a geographic region and assign probability values outputted from the neural network to points in the point cloud data. The clustering module is configured to group a subset of the probability values based on relative locations of the assigned points in the point cloud data. The factorization module is configured to factor a matrix with the subset of the clustered probability values to assign a line for a three dimensional object of the geographic region. The geometric fitting module is configured to fit at least one predetermined shape for the three dimensional object to the point cloud data based at least on the assigned line.

20 Claims, 16 Drawing Sheets

(56) References Cited

U.S. PATENT DOCUMENTS

| | | | | |
|---|---|---|---|---|
| 10,386,480 | B1* | 8/2019 | Campbell | G01S 13/86 |
| 2017/0256060 | A1* | 9/2017 | Eldar | G06T 7/269 |
| 2019/0120947 | A1* | 4/2019 | Wheeler | G01S 17/42 |
| 2019/0130182 | A1* | 5/2019 | Zang | G03B 15/006 |
| 2019/0156128 | A1* | 5/2019 | Zhang | G06K 9/6256 |
| 2019/0266418 | A1* | 8/2019 | Xu | G06K 9/00798 |
| 2019/0272701 | A1* | 9/2019 | Mohan | G07F 17/3211 |
| 2019/0355149 | A1* | 11/2019 | Avendi | A61B 34/20 |
| 2020/0057161 | A1* | 2/2020 | Choiniere | G01S 7/4817 |
| 2020/0097701 | A1* | 3/2020 | Chukka | G06K 9/6274 |
| 2020/0110158 | A1* | 4/2020 | Ecins | G01S 7/497 |

OTHER PUBLICATIONS

Huang, Jing, and Suya You. "Point cloud labeling using 3d convolutional neural network" 2016 23rd International Conference on Pattern Recognition (ICPR). IEEE, Dec. 4, 2016. (pp. 2670-2675).

* cited by examiner

SCALABLE THREE DIMENSIONAL OBJECT SEGMENTATION

FIELD

The following disclosure relates to a scalable framework for object segmentation such as individual pole detection and fitting using combination of deep learning and heuristics.

BACKGROUND

Object detection is an important task in computer vision for computers to understand the world and make reactions. Objection detect is applicable to a variety of technological fields including, but not limited to, navigation, driving assistance, and autonomous driving. Traditional techniques of detecting and mapping objects are non-scalable and expensive because it involves field inspection or manual annotation with high quality data. Other automated techniques of detecting and mapping objects require large computational resources or are too slow to provide optimal results. Moreover, for some applications it may be important to know the exact locations of objects along with their geometric features.

SUMMARY

In one embodiment, a method for segmentation of three dimensional objects includes identifying point cloud data for a geographic region, analyzing the point cloud data with a learned model, assigning probability values outputted from the learned model to points in the point cloud data, clustering the probability values based on relative locations of the assigned points in the point cloud data, generating a matrix with at least a portion of the clustered probability values, factoring the matrix to assign a line for a three dimensional object of the geographic region, and fitting at least one predetermined shape for the three dimensional object to the point cloud data based at least on the assigned line.

In another embodiment, an apparatus for segmentation of three dimensional objects comprises a neural network model, a clustering module, a factorization module, and a geometric fitting module. The neural network model is configured to analyze point cloud data for a geographic region and assign probability values outputted from the neural network to points in the point cloud data. The clustering module is configured to group a subset of the probability values based on relative locations of the assigned points in the point cloud data. The factorization module is configured to factor a matrix with the subset of the clustered probability values to assign a line for a three dimensional object of the geographic region. The geometric fitting module is configured to fit at least one predetermined shape for the three dimensional object to the point cloud data based at least on the assigned line.

In another embodiment, a non-transitory computer readable medium including instructions that when executed are configured to cause a processor to perform analyzing point cloud data with a learned model that outputs probability values for points in the point cloud data, performing a clustering algorithm based on the probability values for the points in the point cloud data and based on relative locations of the points in the point cloud data, calculating at least one characteristic of the clustered probability values, calculating a geometry from the at least one characteristic, and fitting at least one predetermined shape for the geometry.

BRIEF DESCRIPTION OF THE DRAWINGS

Exemplary embodiments of the present invention are described herein with reference to the following drawings.

DETAILED DESCRIPTION

Figure 1:
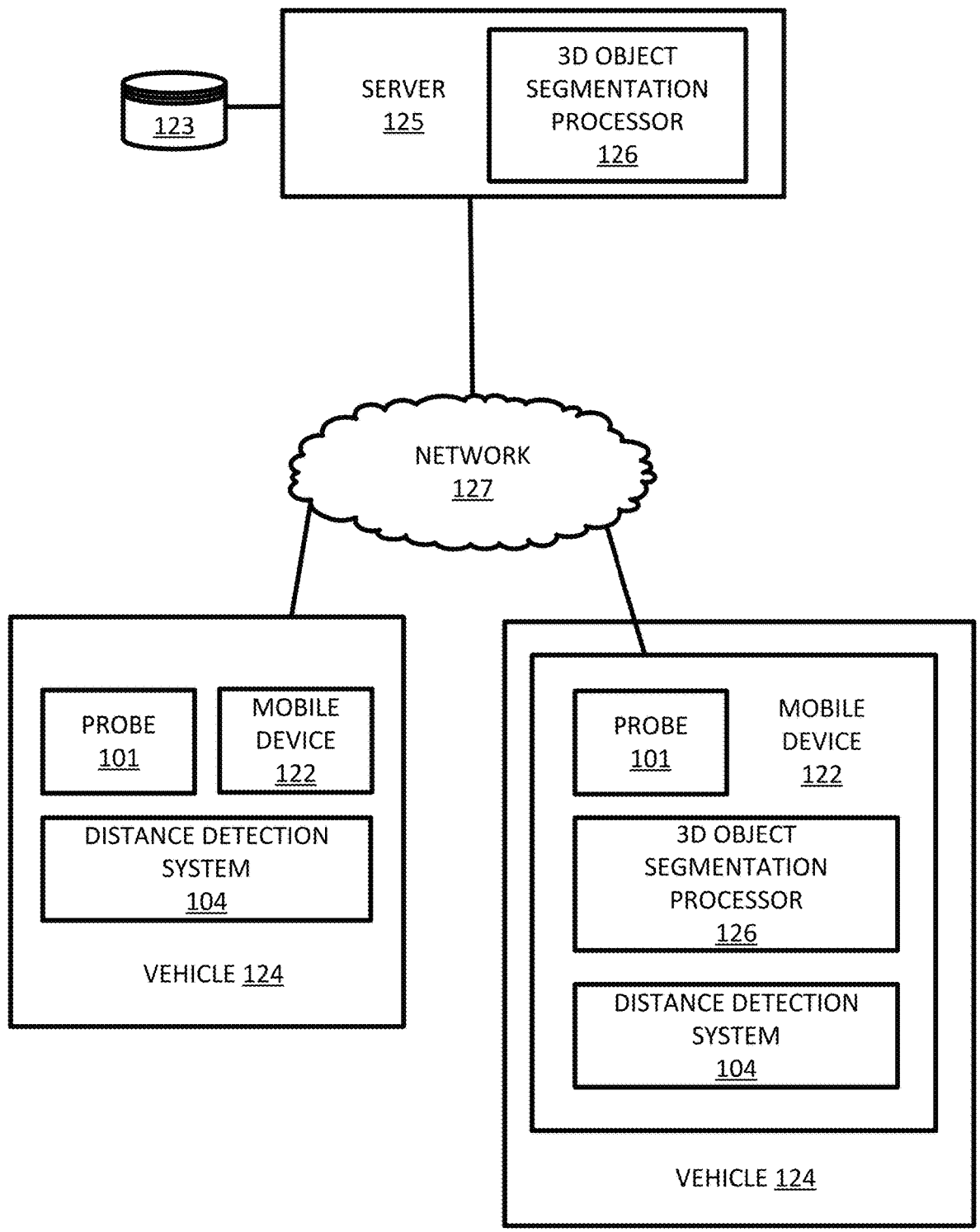
FIG. 1 illustrates an example system for object segmentation.

While driving, the human vision system effortlessly identifies everything in the field of vision ranging from roads, sidewalks, pedestrians, traffic-lights, signs, poles, and other features or objects. However, discerning these objects or features from sensor captured data by a computer is quite a complex task. One common and particularly difficult object to detect is a pole. The pole may support or otherwise be associated with a sign, a traffic light, a utility cable, or another object. Poles are often perpendicular to the scanning path of detection equipment, which causes the smallest dimension of the pole to be included in the scanning path and may complicate detection. Poles may also be shaped similarly to portions of other types of objects such as buildings, which may also make detection difficult.

Traditional methods of detecting and mapping poles are non-scalable and/or expensive. Some techniques involve field inspection or manual selection. In field inspection, a human present may define the location of the poles through visual observation. In manual selection, a human may select the location of the pole from an image or other dataset.

Traditional methods of detecting and mapping poles may also not produce the accuracy for exact pole location required by certain application. Applications such as drone navigation, for example, may require pole location in order to prevent collisions between drones and the poles. In addition, telecom providers may require accurate pole positions in order to facilitate planning for future pole installation or maintenance. For example, telecom providers are interested in attaching radio equipment to existing poles. This may require the size of the pole and type of pole to determine suitability. Precise locations are important to properly estimate radio frequency (RF) line of sight so neighboring radios effectively communicate.

These applications may also require particular geometric features such as top and bottom centroids, radius, height, or other features.

The following embodiments include methods and apparatus for detecting objects such as pole points from point cloud data. One or more deep learning and/or additional algorithms segment objects from the point cloud data. The segmented result is modified using a clustering algorithm to identify individual objects and estimate their geometric features. Known location annotation for objects such as poles may train a fully convolutional neural network. A pixel level prediction from the neural network may be projected onto a 3D point cloud. The projected points with high probability values are filtered or retained. The retained points are clustered to identify objects through constraints and one or more filtering algorithms. Shapes such as cylinders are fit to portions of the points.

The result may be used in a variety of technologies. For example, identified features or objects may be applied to autonomous driving systems or assisted driving systems. The autonomous driving systems may generate driving commands in response to the location of objects. The assisted driving systems may generate driver warnings or supplemental assistance commands in response to the locations of objects. Localization also may also be performed in response to the identified objects or features. For example, the location of a user or vehicle may be determined according to the known location of objects detected in the vicinity of the user or vehicle. Finally, the identified objects or features from the side images may be applied to three-dimensional models and mapping database.

The following embodiments relate to several technological fields including but not limited to navigation, autonomous driving, assisted driving, and other location-based systems. The following embodiments achieve advantages in each of these technologies because an increase in the accuracy and efficiency of object classifications improves the effectiveness, efficiency, and speed of specific applications in these technologies. In each of the technologies of navigation, autonomous driving, assisted driving, and other location-based systems, identifications of objects in collected images improves the technical performance of the application. In addition, users of navigation, autonomous driving, assisted driving, and other location-based systems are more willing to adopt these systems given the technological advances in object classification.

FIG. 1 illustrates an example system for object segmentation. The system includes a server 125 and a mobile device 122 connected by a network 127. A database 123 (e.g., a geographic database or map database) may store locations an identities for the segmented objects. In some examples, the server 125 may include a 3D object segmentation processor 126 for analyzing sensor data collected by the mobile device 122. In other examples, a mobile device 122 may include a 3D object segmentation processor 126 for analyzing the sensor data. The vehicles 124 and/or mobile devices 122 may include a distance detection system 104. In some examples, the vehicles 124 may be directly connected to the server 125 or through an associated mobile device 122. The server 125 and the geographic database 123, exchanges (e.g., receives and sends) data from the vehicles 124. Additional, different, or fewer components may be included.

The mobile device 122 may include mapping applications, navigational applications, or driving applications. The driving applications may calculate driving commands for controlling a vehicle. The driving applications may generate warnings or other messages for a driver or passenger of the vehicle. Localization may be performed using the data collected at the vehicle. In localization, objects or features detected from the sensor are compared to a fingerprint or template of known objects or features that is tied to a geographic location. The mapping applications may provide maps including the location of the vehicle as determined by the localization. The navigational applications may present routes (e.g., turn-by-turn directions) that are calculated according to the analysis of data collected at the vehicle.

The mobile devices 122 may include local databases corresponding to a local map, which may be modified by to the server 125 using the geographic database 123. The local map may include a subset of the geographic database 123 and is updated or changed as the vehicles 124 travel. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the geographic database 123.

The distance detection system 104 may include a light detection and ranging (LiDAR) device, a structured light device, or one or more stereo cameras. The distance detection system 104 may generate a point cloud of data based on the surroundings of the distance detection system 104. The point cloud may include data points that represent objects in the surroundings of the mobile device 122 and/or vehicles 124.

The LiDAR device may include a scanner that rotates to deflect lasers in varying directions using one or more mirrors. Pulses of lasers may extend radially from the mirror of the distance detection system 104. A series of LiDAR measurements may represent measurements taken as the mirror and laser pulses sweep radially through the environment. The distance to the nearest surface point along any given laser direction is obtained by firing a laser pulse and measuring its time-of-flight (e.g. the time elapsed between firing and returning to the mirror). The sequence of distance measurements obtained by the scanner is thus the result of repeated distance measurements as the laser direction is varied. The distance detection system 104 may also measure a change in wavelength of the laser pulse from when the laser pulse was sent and when the pulse was received. Multiplying the time of flight by the speed of the laser pulse and dividing in half gives the distance from the lidar sensor to a surface that reflected the laser pulse. The measured angle may be an azimuth angle or a polar angle at which the laser pulse was sent or received by the lidar sensor. The measurements from the lidar scanner may be used to generate the location of a point in space.

The point cloud may be collected from the roadway by a collection vehicle 124, which may be an autonomous vehicle. Alternatively, the point cloud is an aerial point cloud collected from an aerial vehicle. The aerial vehicle may be an airplane or a drone. In another example, the point cloud is collected from an orbiting vehicle such as a satellite.

When the distance detection system 104 is a structured light device, structured light may include a projection of a predetermined pattern in the vicinity of the collection vehicle. The deformation of the predetermined pattern, which is collected by an image capture device, may be analyzed to determine the position and objects in the vicinity of the collection vehicle. When the distance detection system 104 is a stereo camera, two or more lenses with separate image sensors collect different images of the surroundings of the vehicle 124 or mobile device 122. The images are compares to create a three-dimensional images or a point cloud that describes the three-dimensional positions of objects in the surroundings of the vehicle 124 or mobile device 122.

Each vehicle 124 and/or mobile device 122 may include position circuitry (e.g., probe 101) such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
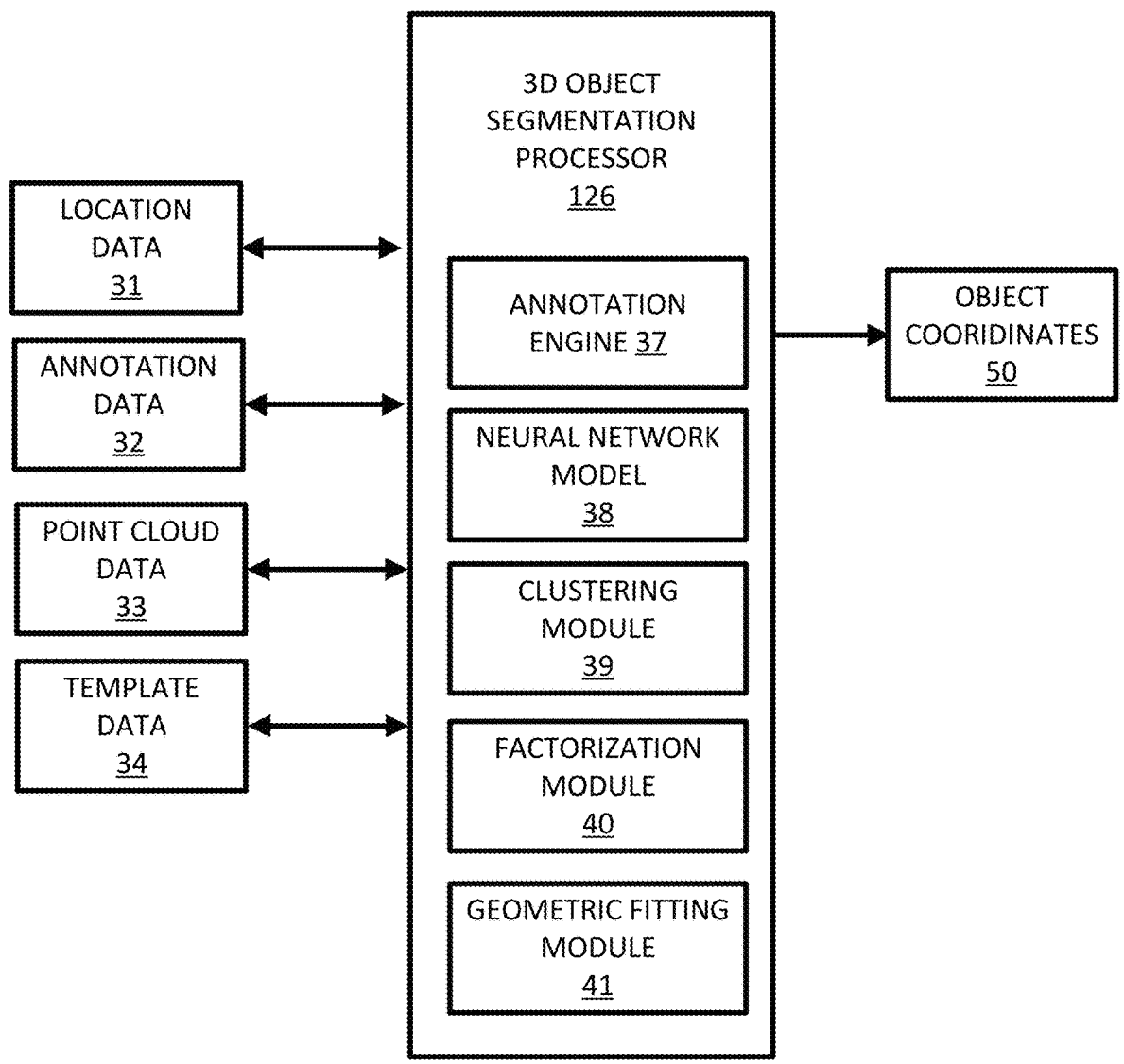
FIG. 2 illustrates an example of the object segmentation processor of FIG. 1.

FIG. 2 illustrates an example of the object segmentation processor 126 of FIG. 1. The object segmentation processor 126 may include an annotation engine 37, a neural network module 38, a clustering module 39, a factorization module 40, and a geometric fitting module 41. The object segmentation processor 126 may receive location data 31, annotation data 32, point cloud data 33, and template data 34 and output object coordinates 50. Additional, different, or fewer components may be included.

The mobile device 122 may collect location data 31 through probes 101. The location data 31 may include coordinates for the mobile device 122 that are associated for collection of point cloud data 33. For example, the distance values in the point cloud data 33 may be measured from the location of the mobile device 122 at the time at which the point cloud data 33 was collected. The point cloud data 33 may be assembled from location data 31 and distance data taken at multiple locations. The mobile device 122 may collect the point cloud data 33 through the distance detection system 104. The point cloud data 33 may include a scan of data collected at a particular position described by the location data 31. The point cloud data 33 may be generated from multiple scans from different positions described in the location data 31.

Figure 3:
FIG. 3 illustrates an example point cloud.

FIG. 3 illustrates an example point cloud 33. The example point cloud 33 in FIG. 3 includes multiple objects, including objects 51. While a pole is pictured, the object 51 may include different types of objects. The point cloud 33 is illustrated in scans 52 that correspond to the scanning operation of the distance detection system 104. In FIG. 3, the point cloud 33 is colorized (e.g., in grayscale) in order to illustrate features in the geographic region. The point cloud 33 may be colorized based on the intensity of the reflection back to the distance detection system 104. The point cloud 33 may be colorized based on pixel colors from an image collected in association with the point cloud 33.

The object segmentation processor 126 is configured to identify the point cloud 33 for a geographic region. That is, the object segmentation processor 126 may receive location data 31 (e.g., from a probe 101) and select a portion of the point cloud 33 based on the geographic region.

In another example, the point cloud 33 is analyzed directly from a feed of data that is output from distance detection system 104. The feed of data includes a first dimension based on a size of a sensor array of the distancing system and a second dimension based on the scan of the sensor array. As the sensor array reads data, the width or number of sensors defines the height of the data. As the mirror rotates, the scan of the sensor array defines the length of the data, which may be a continuation feed. The continuous feed may be broken up or divided in predetermined sections for analysis.

Figure 4:
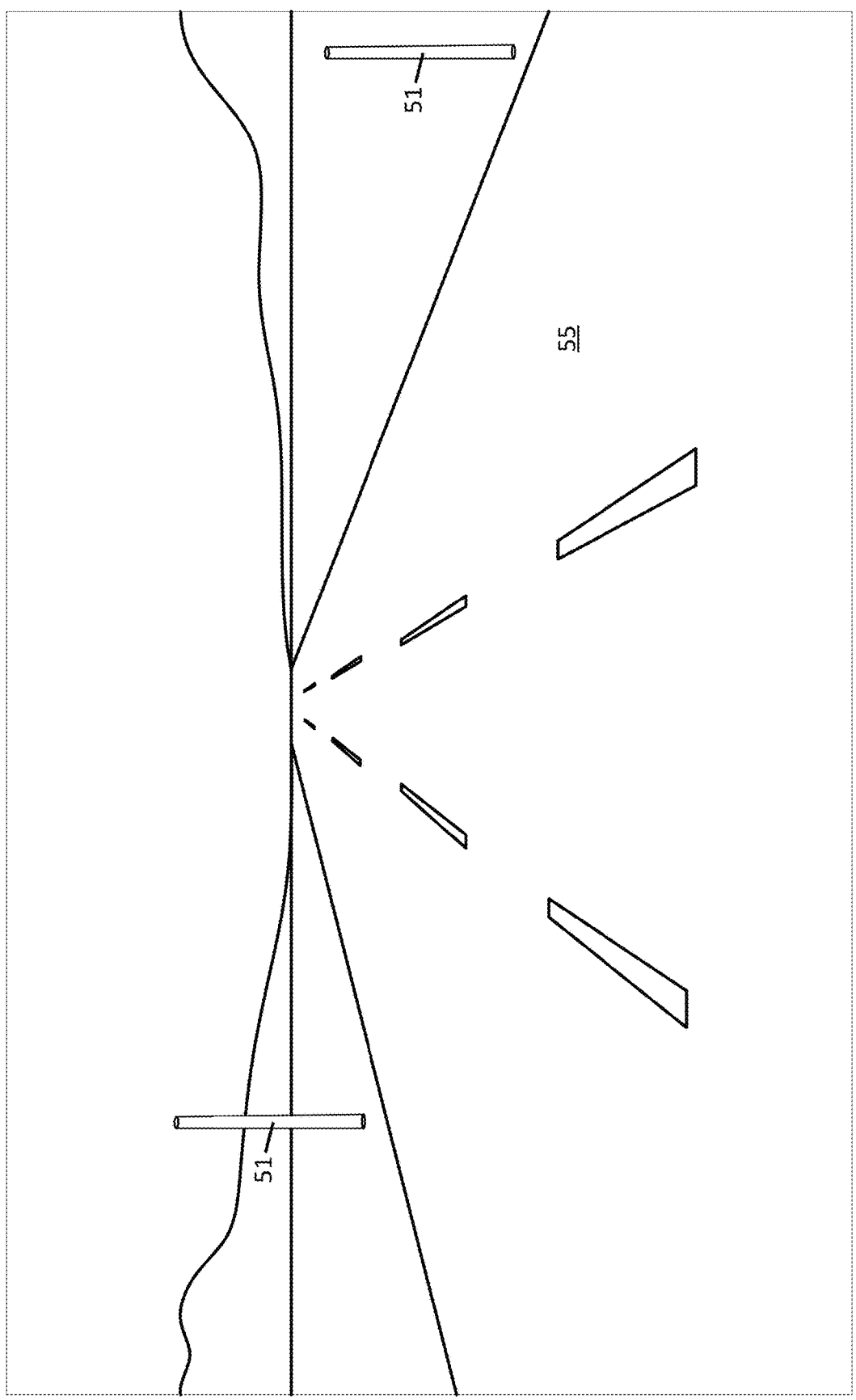
FIG. 4 illustrates an example scene including a pole.

FIG. 4 illustrates an example scene including one or more objects 51 placed along a roadway 55. The vehicle 124 may travel along the roadway 55 while collecting the location data 31 and the point cloud data 33. While illustrated as free-standing structures, the poles may support or otherwise be associated with a variety of other objects. The poles may be utility poles that support transmission lines such as telephone cables, electric power cables, or television cables. The poles may support transportation objects such as a train, gondola, or vehicle platform. The poles may support lighting such as street lights. The poles may support solar panels or windmills. The poles may support landing platforms for aerial vehicles.

The scene may be displayed to a user to define or select the location within the scene for the objects 51. The objects 51 may be selected in a two-dimensional plane for the scene that represents the three-dimensional point cloud 33.

For example, the annotation data 32 may include known locations for the objects in the point cloud data 33. The annotation data 32 may include image location or absolute locations for the objects in the point cloud data 33. The image locations may be defined according to pixel locations. The absolute locations may be defined according to geographic coordinates including a height value. The annotation data 32 may include multiple points, for example, at least three points that define a polygon for the object. The polygon may be a triangle, rectangle or another shape. The annotation data 32 may include points for the outline of the object.

In some examples, the annotation data 32 is generated at another apparatus and provided to the object segmentation processor 126. In other examples, the annotation data 32 is generated at the object segmentation processor 126 by the annotation engine 37. The object segmentation processor 126 may be configured to receive user inputs (e.g., at a touchscreen or other input device) for the annotation data 32. The annotation engine 37 may associate the user inputs with the point cloud data 33.

In either case, the annotation engine 37 is configured to associate user inputs with ground truth values for one or more three dimensional objects. The annotation data 32 may be a ground truth for the point cloud data 33. The ground truth may be used to train a learned model such as the neural network module 38.

Figure 5A:
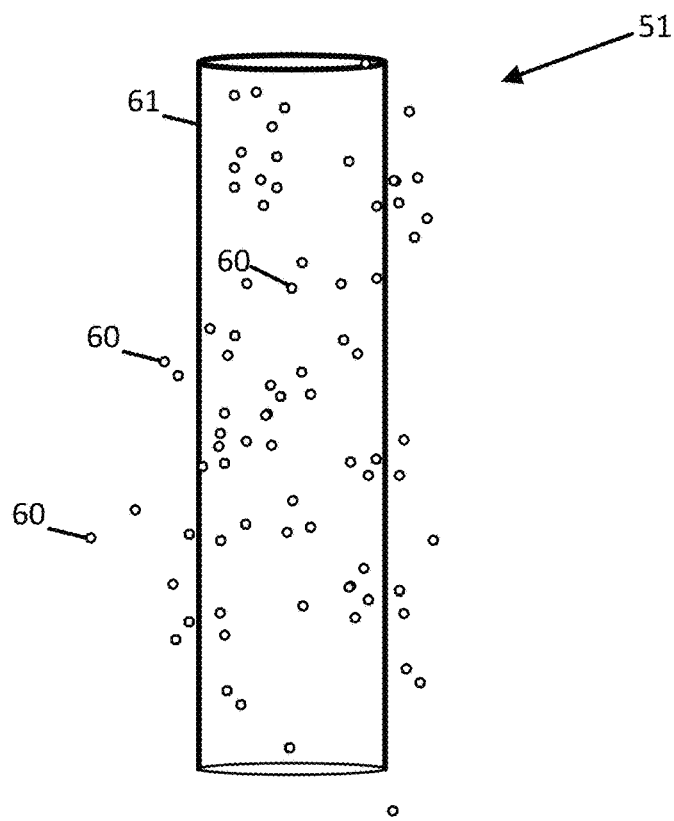
FIG. 5A illustrates example point cloud data.

FIG. 5A illustrates example point cloud data for a pole as the object 51. Points 60 represent points in the point cloud data 33. It should be noted that the outline 61 of the pole is for illustrative purposes to show how the points 60 relate to the actual location of the pole.

The neural network module 38 is configured to analyze the point cloud data 33 with a neural network. The object segmentation processor 126 operates the neural network module 38 in a plurality of modes including a training mode and an inference mode. In the training mode, the annotation data 32 is provided by to the neural network module 38 as ground truth, and the neural network module 38 generates one or more layers with one or more coefficients for nodes of the neural network. The layers and/or coefficients define how the neural network module 38 analyzes subsequent data in the inference mode. For example, in the training mode values for the matrices for the filters or kernels used by convolutional modules of the neural network are calculated. These values are adjusted over multiple iterations. Eventually, the object segmentation processor 126 is able to analyze the point cloud 33, without knowledge of the ground truth, to estimate the same class labels provided by the ground truth.

In one example, the object segmentation processor 126 and the neural network module 38 reads the point cloud data 33 from a feed of data from a distancing system that is defined according to the size and operation of the distance detection system 104, for example, LiDAR scanner. The output of the LiDAR scanner may control the width of the data provided in the feed that is processed by the neural network module 38.

In the inference mode, the output of the neural network module 38 describes detected locations of objects in the point cloud data 33. The training mode and inference mode may be performed sequentially (e.g., first the training more and then the inference mode) or simultaneously. In the inference mode, the object segmentation processor 126 provides classifications to additional point cloud data using the values for the matrices for the filters or kernels used by the convolutional modules that were determined in the training mode. In some examples, the training mode continues during the inference mode. The output of the neural network module 38 may be probability values. The object segmentation processor 126 may be configured to assign probability values outputted from the neural network module 38 to points in the point cloud data. Alternatively, the object segmentation processor 126 may be configured to assign probability values outputted from the neural network module 38 to pixel locations in a two-dimensional representation or projection of the point cloud 33.

The clustering module 39 is configured to group a subset of the probability values based on relative locations of the assigned points in the point cloud data. Initially, the probability values may be filtered, for example, compared to an initial threshold, to select probability values that meet the initial threshold and are used in clustering.

In one example, the probability values are clustered using a density-based spatial clustering of applications with noise (DBSCAN). The clustering module 39 defines clustered points and outliers from the probability values. Cluster points are points, which have already met the initial threshold, and also meet a distance threshold for distance to the nearest neighbor. The clustering module 39 calculates distances between pairs of points and compares the distances between pairs of points to the distance threshold. Points that do not meet the distance threshold are outliers. The clustered points may represent the object 51. The clustered points may be defined such that the points in the cluster are mutually density connected and if a point is density reachable from any point of the cluster, the point is part of the cluster.

Figure 5B:
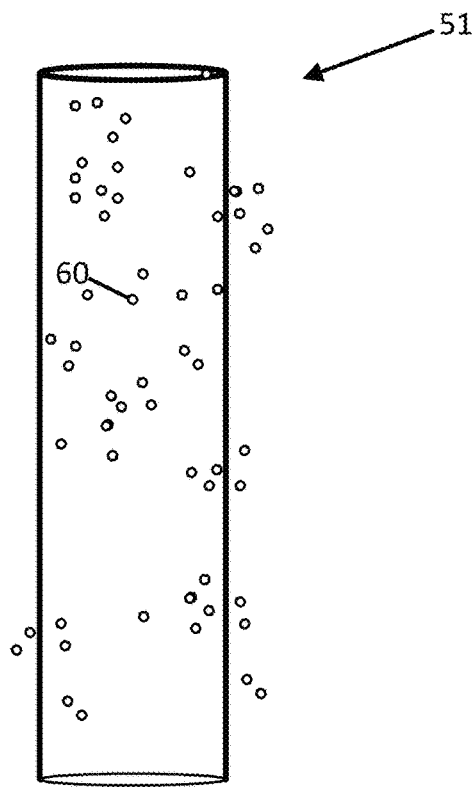
FIG. 5B illustrates example clusters associated with a pole for the point cloud data of FIG. 5A.

In one example, the outlier points are divided from the cluster points using an iterative technique such as random sample consensus (RANSAC). The iterative technique may fit a linear model to random samplings of the data. The fitting process is repeated through multiple random samplings. The sampling with the best fit has the fewest outliers. Points outside of the best fitting ransom sampling are assigned to be outliers and may be removed from subsequent analysis. FIG. 5B illustrates example clusters associated with the pole for the point cloud data of FIG. 5A with the outliers removed.

Figure 6A:
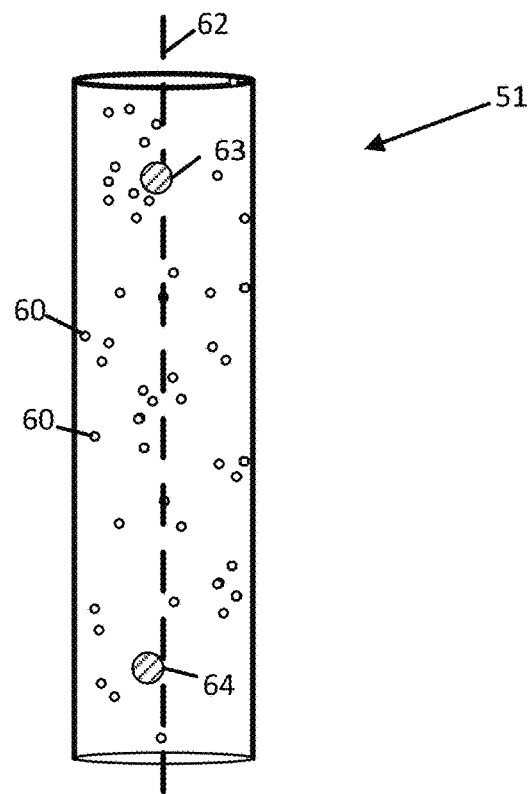
FIG. 6A illustrates factorized clusters for the pole of FIG. 5B.

FIG. 6A illustrates factorized clusters for the object of FIG. 5B. The factorization module 40 is configured to factor a matrix with the subset of the clustered probability values to assign a line 62 for a three dimensional object of the geographic region.

The factorization module 40 may calculate one or more eigenvalues or eigenvectors for the clustered points for the object, which may be referred to as a neighborhood. First, a matrix is generated or computed for the points in the neighborhood, for example, including at least a portion of the clustered probability values. The factorization module 40 performs singular value decomposition (SVD) on the matrix to identify the eigenvalues or eigenvectors.

The matrix may be of various sizes. In one example, the matrix includes a row for each point in the cluster and a column for each dimension of the space of the clustered points. For example, in a three-dimensional point cloud in (X, Y, Z), the matrix may have three columns. The factorization module 40 computes eigenvalues for the matrix and calculates one or more directions for axes or axis angles for the object based on the eigenvalues. The axis eigenvalues and/or eigenvectors may describe an angle by which the axis deviates from a reference axis such as a horizontal plane or a vertical place. The vertical plane may be the plane parallel to the direction of gravity or perpendicular to the surface of the earth. The horizontal plane may be the plane parallel or tangent to the surface of the earth and/or perpendicular to the vertical plane. The factorization module 40 may assign or calculate the line 62 for the three dimensional object based on the eigenvalues or eigenvectors for the first axis or primary axis of the object.

The factorization module 40 may calculate the first axis or first axis angle for the primary axis of the object. The primary axis may be the longest or longitudinal dimension of the object. The first axis angle may be an angle between the first axis and the horizontal plane. The factorization module 40 can calculate a second and third axis of the object and their directions.

Figure 6B:
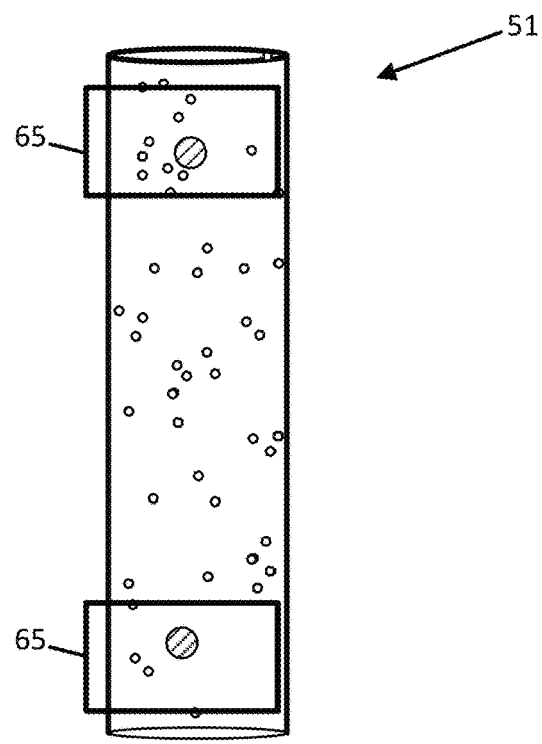
FIG. 6B illustrates geometries fit to the factorized cluster of FIG. 6A.

The factorization module 40 is also configured to calculate a first centroid 63 for a top portion of the three-dimensional object and calculate a second centroid 64 for a bottom portion of the three-dimensional object. In order to compute the centroids, first the module estimates the planes that are perpendicular to the first axis and holds the second and the third axis. The module estimates the planes at the top and the bottom of the object based on the top-most and the bottom-most altitude. Then based on the intersection of the planes and the first axis (computed using SVD), the module infers the top and the bottom centroids. Based on the shape of the object, centroids may also be computed in different ways. For example, the first centroid 63 may be the center of a top quantile (e.g., quartile, quintile, or decile) and the second centroid 64 may be the center of a bottom quantile (e.g., quartile, quintile, or decile). FIG. 6B illustrate quantiles 65 fit to the factorized cluster of FIG. 6A.

Figure 7A:
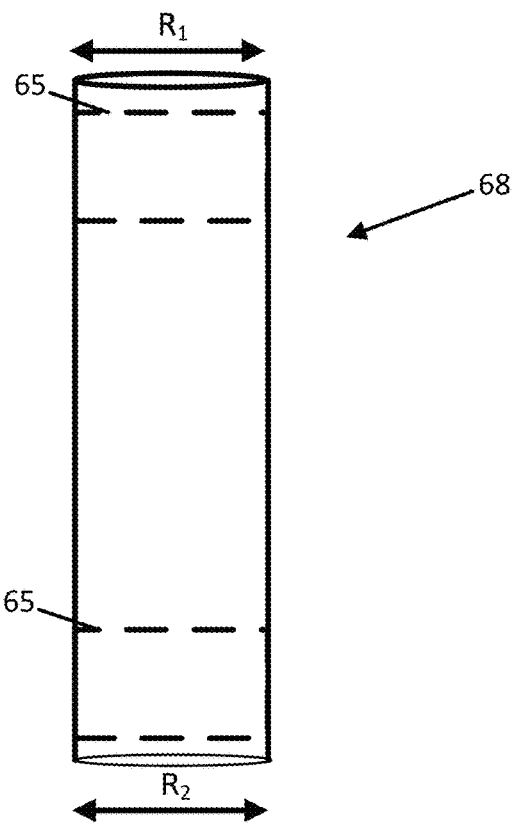
FIG. 7A illustrates a cylinder based on the geometries of FIG. 6B.

In addition or in the alternative, the geometric fitting module 41 is configured to select at least one predetermined shape for the three dimensional object is selected based on the first centroid 63 and the second centroid 64. FIG. 7A illustrates at predetermined shape 68 such as a cylinder. In some example, the shape may be selected based on the geometries for the quantiles 65 of FIG. 6B.

The template data 34 may include one or more of the predetermined shapes that are assigned to the cluster. The template data 34 may include geometric shapes for different types of objects. The template data 34 may include geometric shapes for different types of poles. The template data 34 may include a template for a sign post, a template for a utility pole, a template for a traffic light pole. The object segmentation processor 126 may compare the template data 34 to the one or more of the line 62, the first centroid 63 and the second centroid 64 to select a template that matches the cluster.

In another example, the geometric fitting module 41 is configured to generate the predetermined shape that fits the cluster. The geometric fitting module 41 calculates a first radius and a second radius from the matrix with at least a portion of the clustered probability values. The first radius is computed based on the points located at the plane holding the second and third axis at a top portion of the cluster using a RANSAC based circle fitting approach. The second radius is computed based on the points located at the plane holding the second and third axis at a bottom portion of the cluster using a RANSAC based circle fitting approach. The geometric fitting module 41 may generate a three dimensional shape having the first radius and the second radius. For example, the first radius may define the top of a cylinder and the second radius may define a bottom of the cylinder.

Figure 7B:
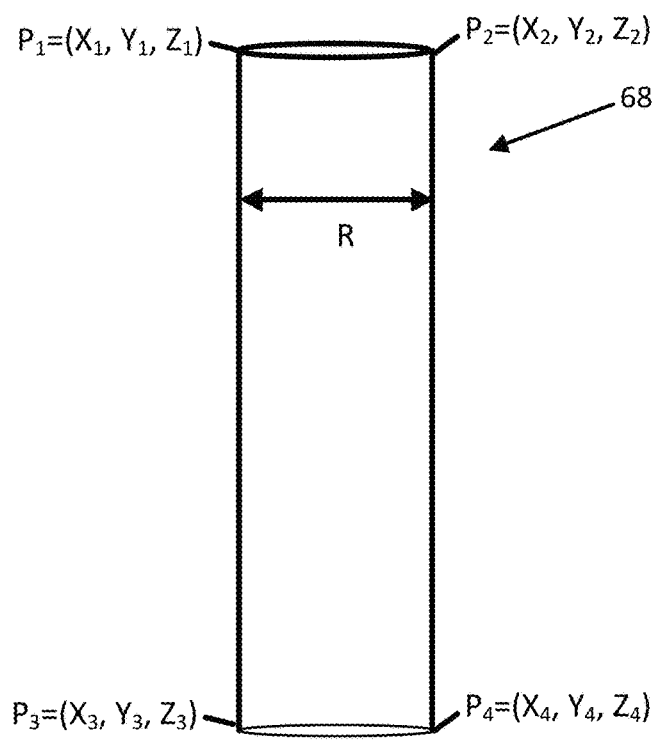
FIG. 7B illustrates object coordinates for the cylinder of FIG. 7A.

FIG. 7B illustrates object coordinates for the predetermined shape of FIG. 7A. The object coordinates may include points for the outline of the predetermined shape. In the example of FIG. 7A, the object coordinates may define a vertical cross section of a cylinder, which may be the rectangle formed by points $P_1=(X_1, Y_1, Z_1)$, $P_2=(X_2, Y_2, Z_2)$, $P_3=(X_3, Y_3, Z_3)$, and $P_4=(X_4, Y_4, Z_4)$.

Figure 8:
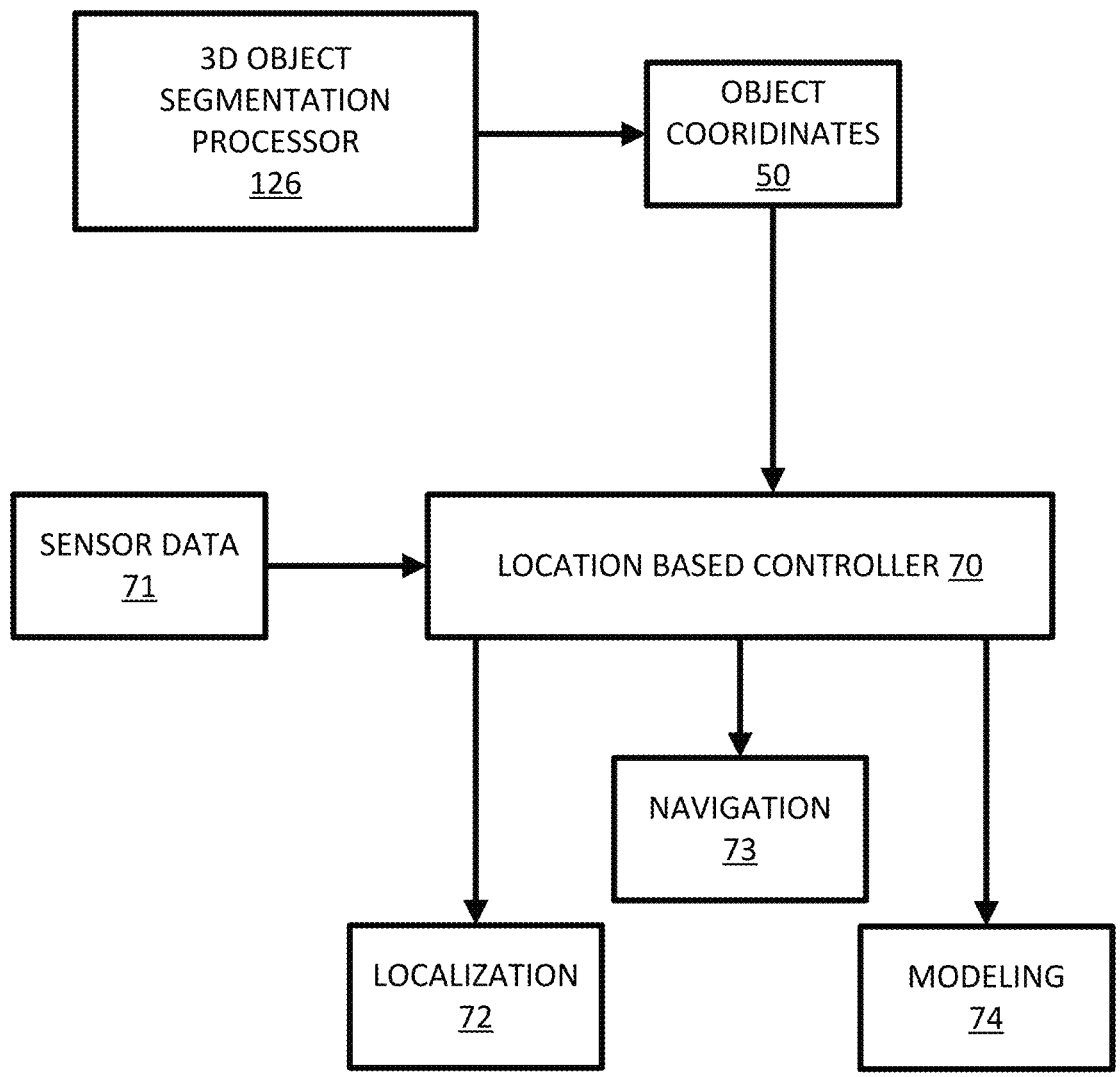
FIG. 8 illustrates a controller for location based services.

FIG. 8 illustrates a system for location based services. The object segmentation processor 126 may provide object coordinates 50 for the predetermined shape that is fit to the point cloud data to an external device such as a location based controller 70. The location based controller 70 may collect sensor data 71 from one or more other sources. Based on the combination of the sensor data 71 and the object coordinates, the location based controller 70 provides localization 72, navigation 73, and/or modeling 74. The location based controller 70 may include a communication interface or device configured to provide the object coordinates 50 for the predetermined shape in the point cloud data 33 to an external device to provide localization 72, navigation 73, and/or modeling 74. Additional, different, or fewer combinations may be included.

For localization, the location based controller 70 may search through multiple fingerprints to select a fingerprint for the current location of the mobile device 122. The fingerprint describes objects in the vicinity of locations. The fingerprints may include certain types of objects 51 such as poles. That is, a pattern of poles, including relative locations of poles to a specific location, may define a particular location in a fingerprint. Subsequently, when a vehicle 124 or a mobile device 122 detects the location of the objects or poles, for example, using distance detection system 104, the location based controller 70 searches the fingerprints to determine whether the detected pattern of objects or poles matches any of the fingerprints. The location based controller 70 is configured to perform a comparison of the three dimensional object to a geographic fingerprint and determine a location based on the comparison.

For navigation, the location based controller 70 may generate one or more navigation instructions that reference the object 51. The navigation instruction may be provided to the vehicle 124 for a driver or autonomous driving system to follow and reference the object 51. For example, the navigation instruction may instruct to make a turn after a pole.

Figure 9:
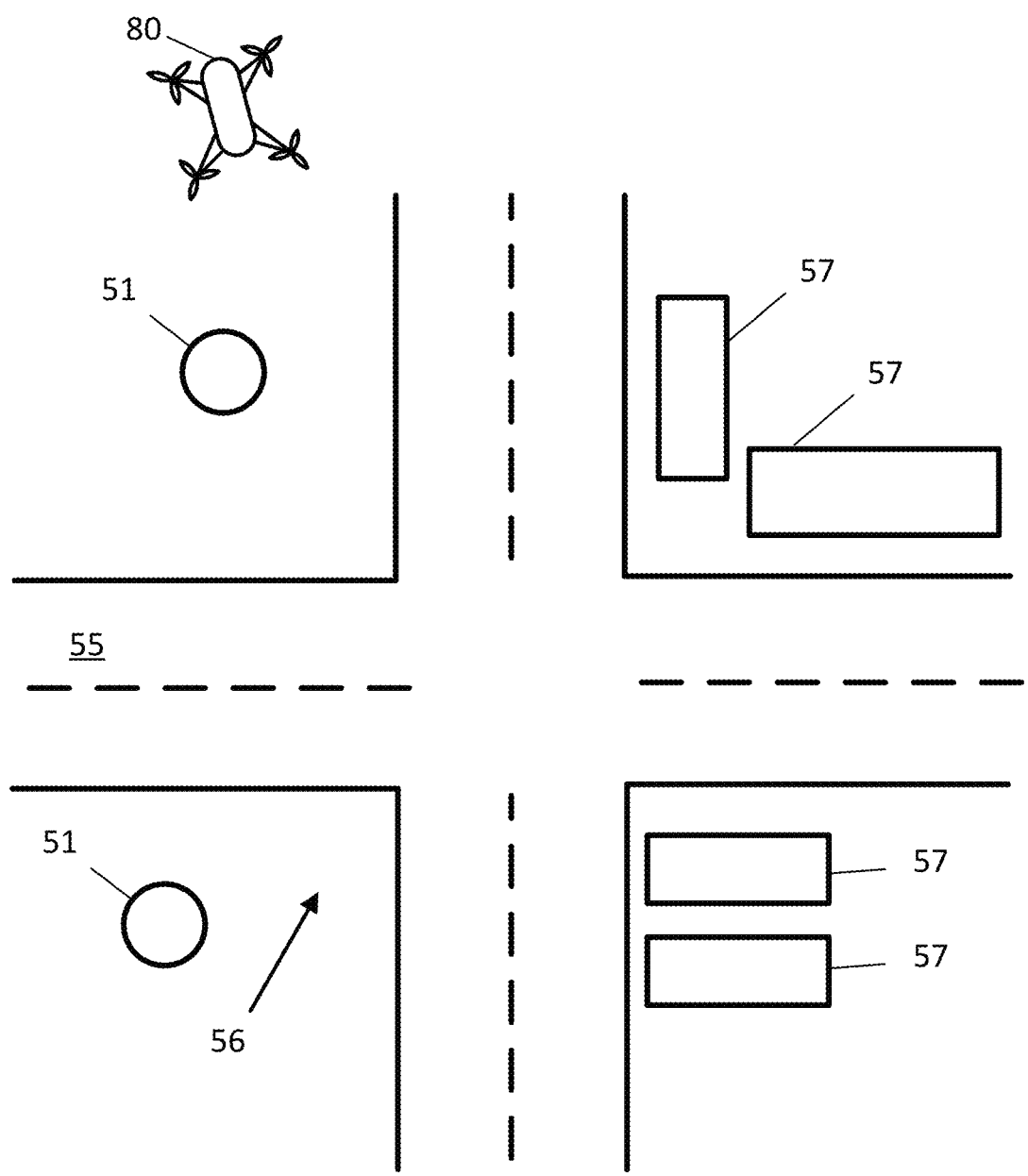
FIG. 9 illustrates drone navigation associated with a pole.

FIG. 9 illustrates an aerial vehicle 80 (e.g., drone or unmanned aerial vehicle) implementing navigation associated with the object 51. The aerial vehicle 80 may be traveling in the vicinity of a roadway 55, an intersection 56, and one or more buildings 57. The object segmentation processor 126 is configured to generate a navigation instruction for the aerial vehicle 80 in response to the three dimensional object. For example, the aerial vehicle 80 may be instructed to navigate around the pole to avoid a collision. The navigation instruction may reference the object 51 in combination with the roadway 55, the intersection 56, and/or the one or more buildings 57.

In another example, the aerial vehicle 80 may be instructed to navigate to land on the object 51. The object 51 may be a charging pole that is configured to charge the aerial vehicle 80. The charging may be inductive or wireless charging that is provided automatically when the aerial vehicle 80 lands on the pole or hovers near the pole. In one example, the aerial vehicle 80 may be configured to perch on a pole in response to the navigation instruction. The aerial vehicle 80 may remain perched on the pole for a predetermined time and/or until further instructions are received to carry out a particular function (e.g., delivery, data collection, image collection).

For modeling, the object segmentation processor 126 may store the predetermined shape or the object coordinates 50 for the predetermined shape in the geographic database 123 to represent the geographic region. The model may be a map for the geographic region that includes three-dimensional objects. The model may be displayed, for example, at a vehicle 124 or mobile device 122 as the device travels through the geographic region.

Figure 10:
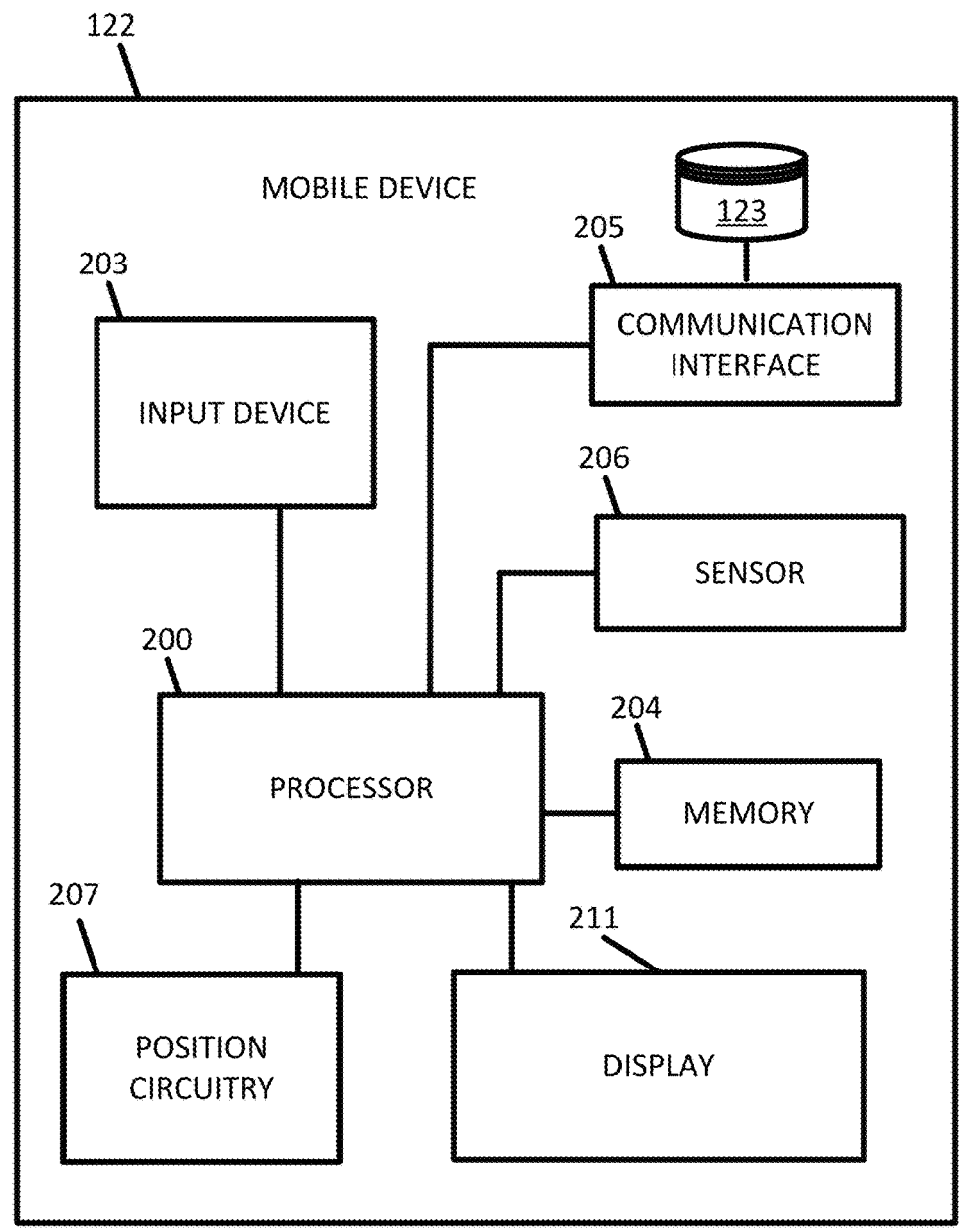
FIG. 10 illustrates an example mobile device implementation of the object segmentation processor.

FIG. 10 illustrates an example mobile device implementation of the object segmentation processor. FIG. 10 illustrates an exemplary mobile device 122 of the system of FIG. 1. The mobile device 122 includes a processor 200, a memory 204, an input device 203, a communication interface 205, position circuitry 207, a display 211, and a sensor 206. The sensor 206 may include one or more of the sensors described herein. The input device 203 may receive commands from the user for settings for the learned model (e.g., neural network), such as the type of the neural network. The default settings may also include a selection of the category of object that is detected (e.g., traffic related objects, infrastructure related objects, or other categories). The default settings may also include a selection of a specific type of object (e.g., pole, fire extinguisher, vehicle, or other objects).

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 11:
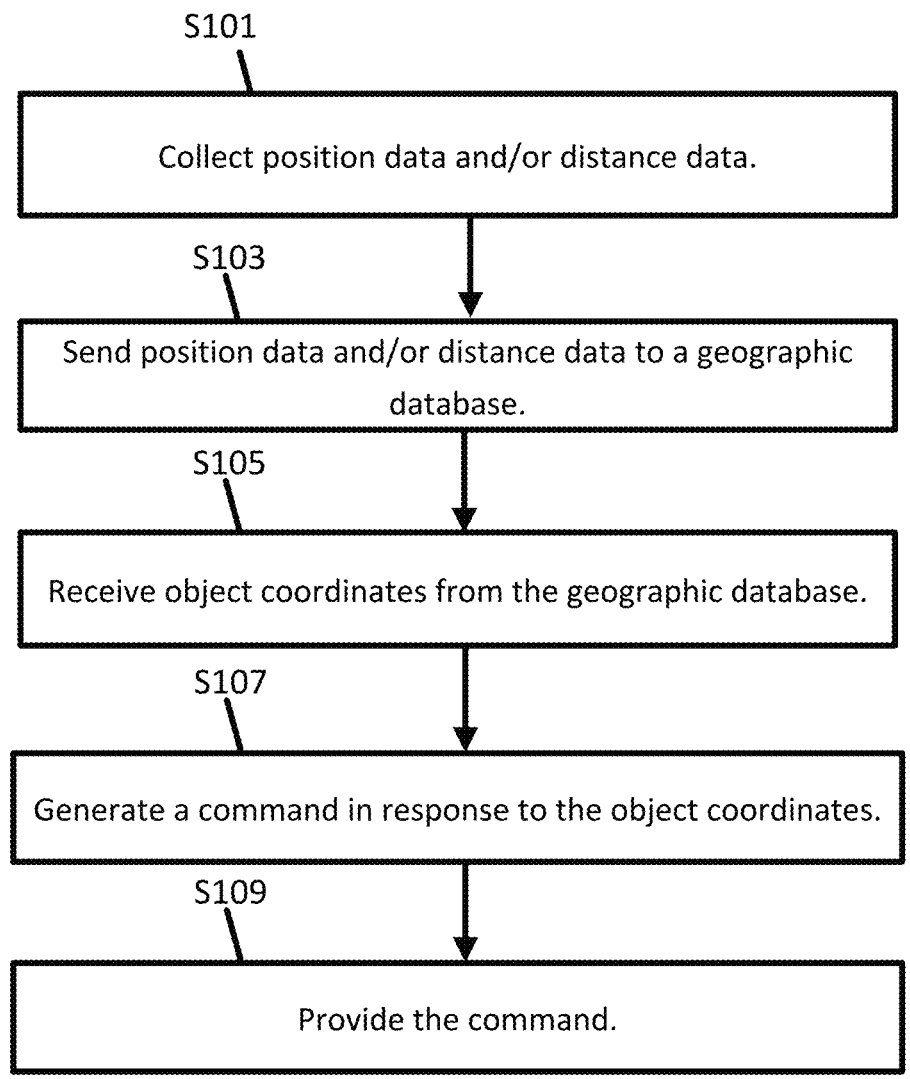
FIG. 11 illustrates an example flow chart for the operations of the mobile device.

FIG. 11 illustrates an example flow chart for the operation of the mobile device 122. Additional, different, or fewer acts may be provided.

At act S101, the sensor 206 collects position data and/or distance data. The position data may be determined by position circuitry 207, which may utilize a GNSS system or another technique. The distance data may be determined by a camera, a LiDAR device, or another distance sensor described herein. The sensor 206 is an example means for collecting position data or distance data.

At act S103, the processor 200, by way of the communication interface 206, sends the position data and/or the distance data to the geographic database 123. From data in the geographic database 123, a location of the mobile device 122 is determined. The location may be determined through direct inference, triangulation, localization, or another technique. The communication interface 206 is an example means for sending the position data or the distance data to the geographic database.

At act S105, the processor 200, by way of the communication interface 206, receives object coordinates from the geographic database 123. The object coordinates may describe a particular object stored in the geographic database and previously identified by the object segmentation techniques described herein. The object coordinates may be stored locally in the memory 204. The object coordinates may include vertices or an outline for the object. For example, when the object is a pole, the coordinates may include a top centroid and radius and a bottom centroid and radius. The communication interface 206 is an example means for receiving object coordinates from the geographic database 123.

At act S107, the processor 200 generates a command in response to the object coordinates. The command may be stored locally in the memory 204. The processor 200 may include a command module including an application specific module or processor that receives and processes the object coordinates. The processor 200 or the sensor 206 is an example means for generating a command in response to the object coordinates.

At act S109, the processor 200 provides the command to one or more other systems associated with the mobile device 122. In some examples, the command is used by an external device. For example, the object coordinates may be utilized to dispatch service personnel or robotic systems to a pole associated with a telecom provider. The dispatched entity may attach equipment to the pole in response to the command. A particular pole may be selected based on the relative positions of other objects in the geographic database in order to preserve line of sign or radio communication.

In some examples, the command is provided internally to the mobile device 122. For example, the command is provided visually at display 211. The command may be provided to aerial vehicle 80 or vehicle 124 as a navigation command for navigation purposes (e.g., turn by turn directions) or a driving command for operation of the vehicle.

Figure 12:
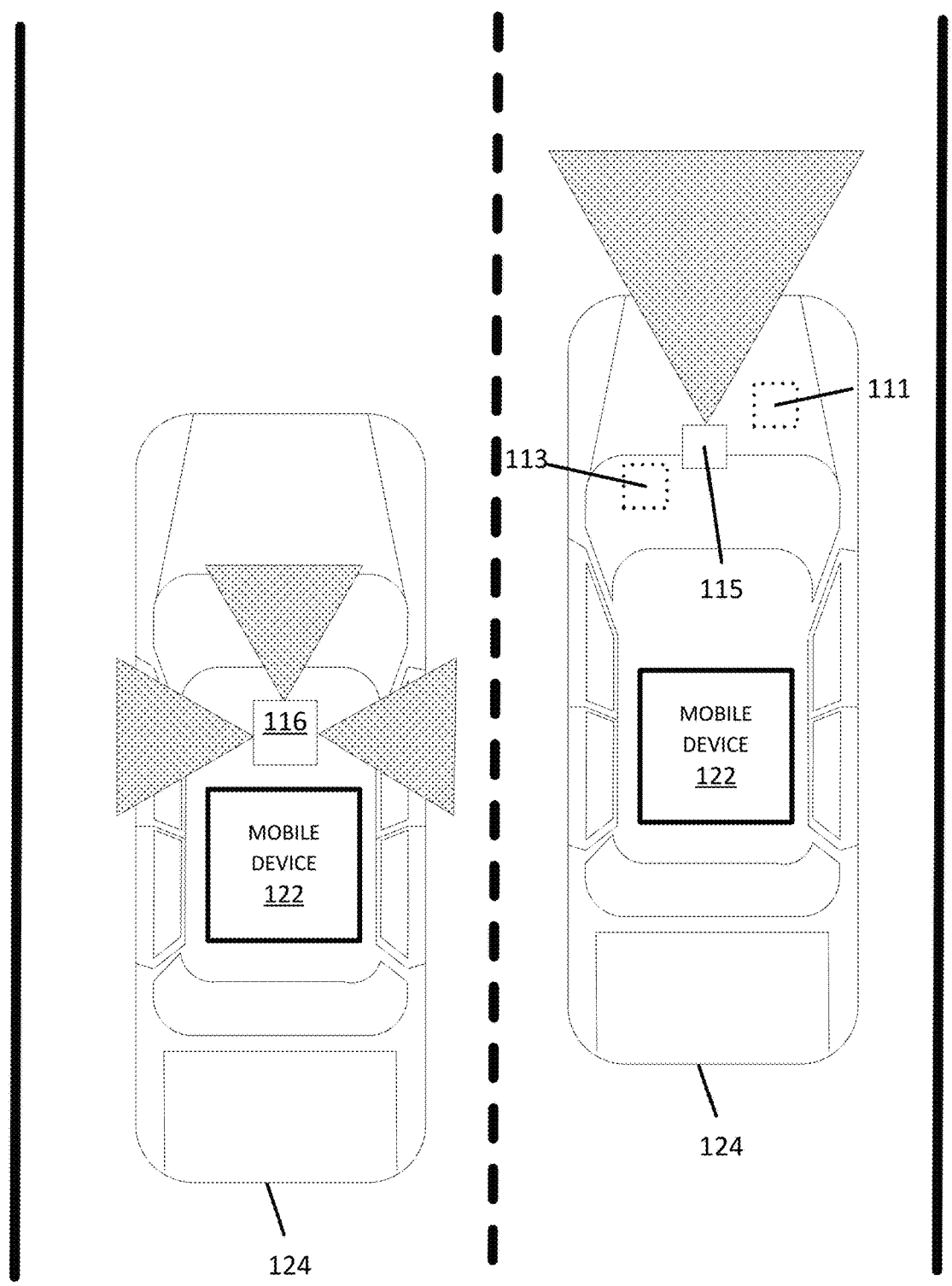
FIG. 12 illustrates exemplary vehicles of the system of FIG. 1.

These examples are discussed in more detail with respect to FIG. 12, which illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the object coordinates determined by the object segmentation processor 106 and/or another model and other geographic data received from geographic database 123 and the server 125 to generate driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the object coordinates determined by the object segmentation processor 106 and/or another model or other geographic data received from geographic database 123 and the server 125 to generate driving commands or navigation commands. For example, the may provide a driving command to the vehicle 124 based on the output of the neural network or other model.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the object coordinates determined by the object segmentation processor 106 and/or another model and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the object coordinates determined by the object segmentation processor 106 and/or other model and other geographic data received from geographic database 123 and the server 125 to generate driving commands or navigation commands.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments, which may be determined based on the output of the neural network or other model and other factors.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 13:
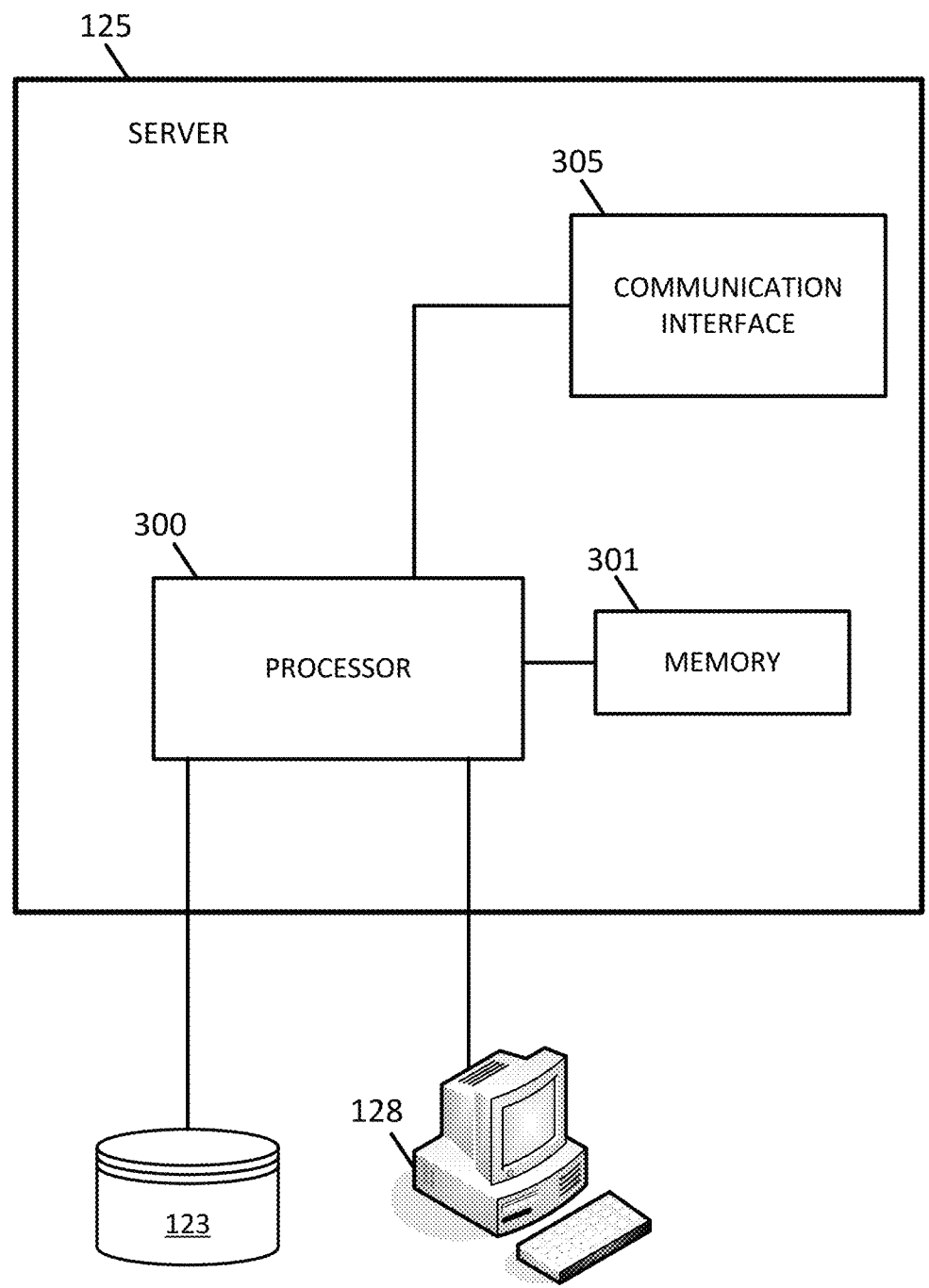
FIG. 13 illustrates an example server implementation of the object segmentation processor.
Figure 14:
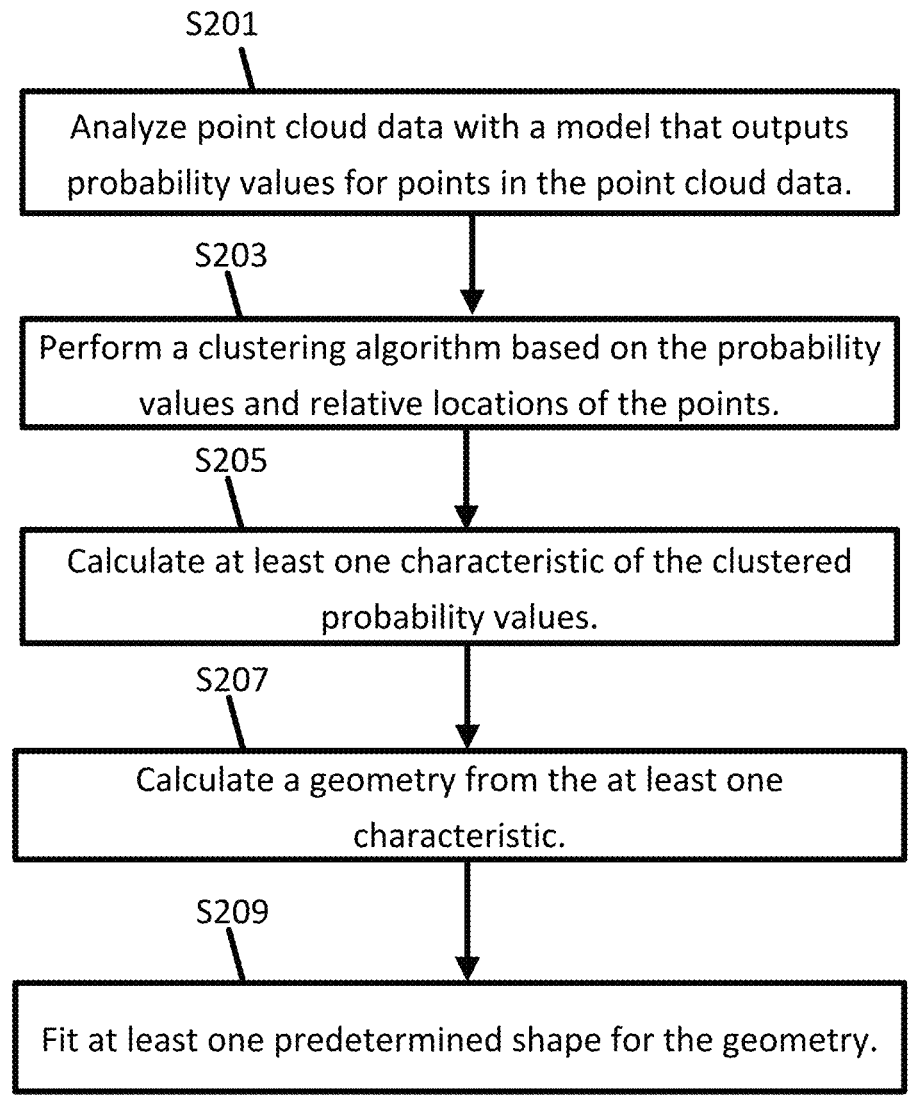
FIG. 14 illustrates an example flow chart for the operations of the server.

FIG. 13 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. The settings may include the type of learned model, which may be a neural network, and the settings may include the parameters of the learned model such as number of layers and techniques employed by the neural network. Additional, different, or fewer components may be provided in the server 125. FIG. 14 illustrates an example flow chart of the server 125 for the neural network training and selection system.

At act S201, the processor 300 is configured to analyze a point cloud data with a learned model that outputs probability values for points in the point cloud data. The communication interface 305 may receive point cloud data as received by a collection device. The collection device may send a stream or feed of data in sections or as the data is collected. The learned model may be trained on historical data to identify a particular type of object in the point cloud data. The output of the learned model may include statistical values associated with points in the point cloud and related to the likelihood that points in the point cloud are part of the particular type of object.

The processor 300 may include a learned model module including an application specific module or processor that generates a neural network or another type of learned model. The processor 300 is an example means for analyzing a point cloud data with a learned model that outputs probability values for points in the point cloud data.

At act S203, the processor 300 is configured to perform a clustering algorithm based on the probability values for the points in the point cloud data and based on relative locations of the points in the point cloud data. The clustering algorithm identifies points with statistical values that exceed a threshold. When these identified points are neighbors in the point cloud data, the processor 300 identifies a cluster. More points are added to the cluster according to distance in the point cloud and the statistical values.

The processor 300 may include a clustering module including an application specific module or processor that performs the clustering algorithm. The processor 300 is an example means for performing a clustering algorithm based on the probability values for the points in the point cloud data and based on relative locations of the points in the point cloud data.

At act S205, the processor 300 is configured to calculate at least one characteristic of the clustered probability values. The characteristic may indicate the shape of the cluster. The characteristic may include an outline of the shape, one or more axes of the cluster, or one or more centroids of the cluster. The centroids may include a global centroid of the entire shape. The centroids may include local of a portion of the shape. For example, the processor 300 may calculate a top portion centroid for the top 10% of the cluster, with respect to the positive Z axis or altitude, and a bottom portion centroid for the bottom 10% of the cluster, with respect to the positive Z axis or altitude.

The processor 300 may include a factorization module including an application specific module or processor that determines at least one characteristic of the clustered probability values. The processor 300 is an example means for calculating at least one characteristic of the clustered probability values.

At act S207, the processor 300 is configured to calculate a geometry from the at least one characteristic. The geometry may be a radius, a length, or a height for the geometry. The geometry may include a radius for the top portion of the clustered probability data and a radius for the bottom portion of the clustered probability data.

The processor 300 may include a geometry module including an application specific module or processor that determines at least one characteristic of the clustered probability values. The processor 300 is an example means for calculating a geometry from the at least one characteristic.

At act S209, the processor 300 is configured to fit at least one predetermined shape for the geometry. The predetermined shape may be associated with the particular type of object being identified from the point cloud data. When the object is a pole, the shape may be a cylinder. The processor 300 may fit the shape to the geometry from the characteristics of the clustered probability values. For example, the geometry from the radius of the top portion is connected to the geometry for the radius of the bottom portion.

The processor 300 may include a clustering module including an application specific module or processor that performs the clustering algorithm. The processor 300 is an example means for performing a clustering algorithm based on the probability values for the points in the point cloud data and based on relative locations of the points in the point cloud data.

Figure 15:
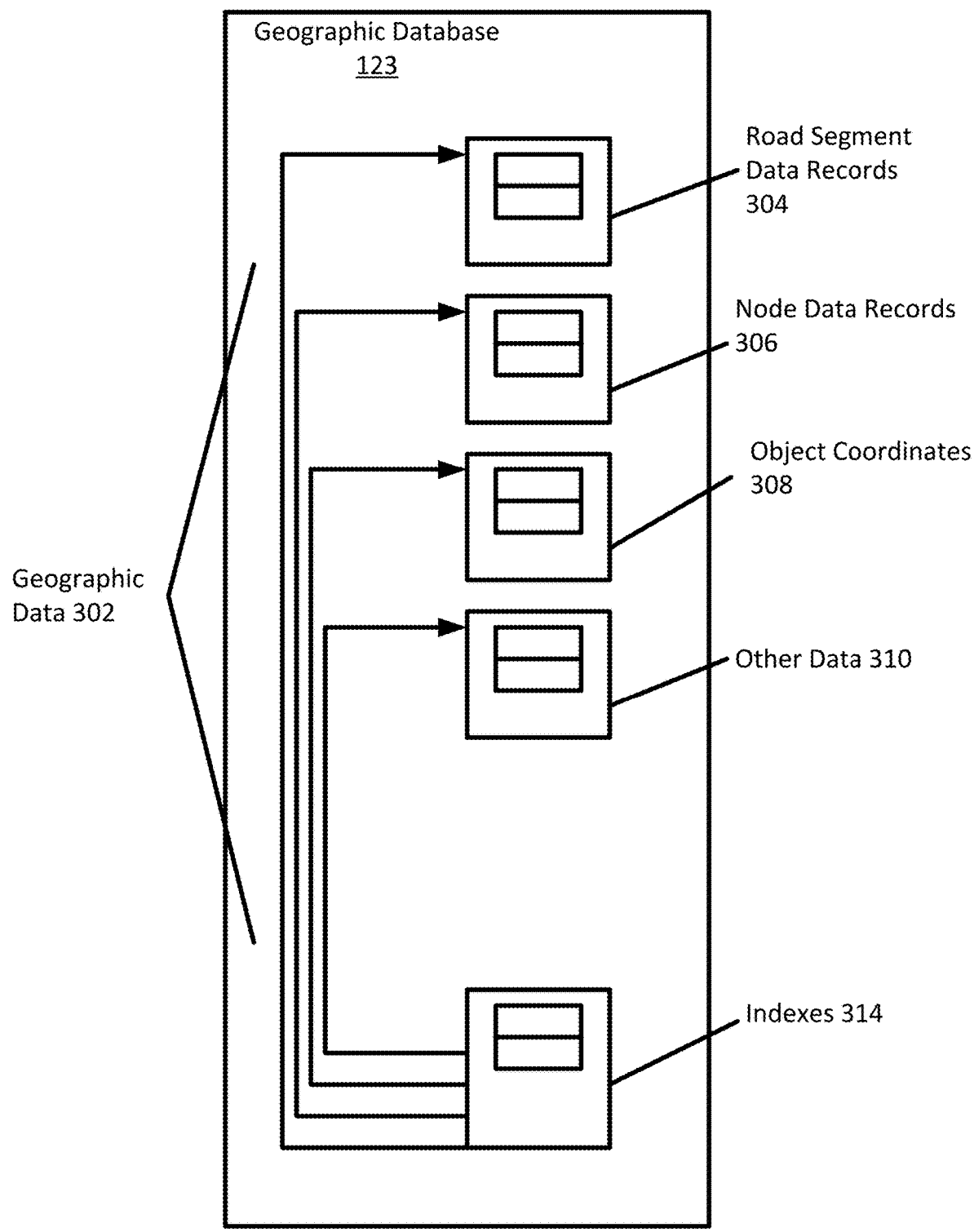
FIGS. 15 and 16 illustrate example geographic databases.

In FIG. 15, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate objects or object coordinates 308 with a road segment in the segment data records 304 or a geographic coordinate. An index 314 may, for example, store data for the object coordinates 308 that are detected from the segmentation techniques described herein.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

Figure 16:
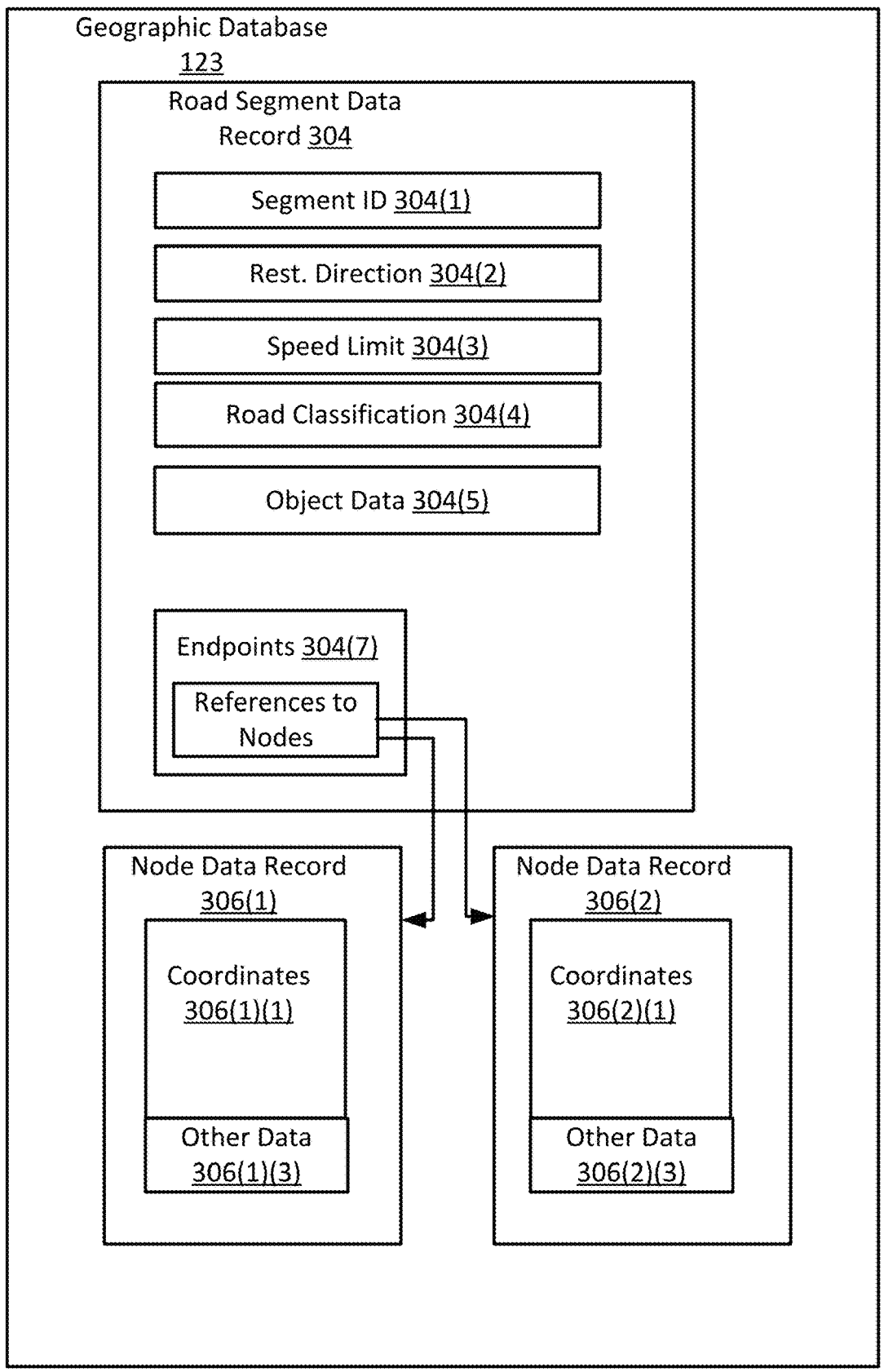

FIG. 16 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe object data 304(5) that indicates where the object (e.g., pole) is located with respect to the road segment. The object data 304(5) may also indicate the type of object (e.g., pole) and/or the shape of the object. The object data 304(5) may include the coordinates that define the outline of the object.

Additional schema may be used to describe road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 16 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, the node data records 306(1) and 306(2) may also include other data 306(1)(3) and 306(2)(3) that refer to various other attributes of the nodes, such as object locations, with respect to the nodes, and properties of the objects detected by the segmentation techniques described herein.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for segmentation of three dimensional objects, the method further comprising:
  identifying point cloud data for a geographic region;
  analyzing the point cloud data with a learned model;
  assigning probability values outputted from the learned model to points in the point cloud data;
  clustering the probability values based on relative locations of the assigned points in the point cloud data;
  generating a matrix with at least a portion of the clustered probability values;
  factoring the matrix to assign a line for a three dimensional object of the geographic region; and
  fitting at least one predetermined shape for the three dimensional object to the point cloud data based at least on the assigned line.

Embodiment 2

The method of embodiment 1, further comprising:
  calculating a first centroid for a top portion of the three dimensional object; and
  calculating a second centroid for a bottom portion of the three dimensional object.

Embodiment 3

The method of embodiment 1 or 2, wherein the at least one predetermined shape for the three dimensional object is selected based on the first centroid and the second centroid.

Embodiment 4

The method of any of embodiments 1 to 3, further comprising:
  calculating a first radius and a second radius from the matrix with at least a portion of the clustered probability values.

Embodiment 5

The method of any of embodiments 1 to 4, further comprising:
  providing coordinates for the predetermined shape in the point cloud data to an external device.

Embodiment 6

The method of any of embodiments 1 to 5, further comprising:
  performing a comparison of the three dimensional object to a geographic fingerprint; and
  determining a location based on the comparison.

Embodiment 7

The method of any of embodiments 1 to 6, further comprising:
  generating a navigation instruction for an aerial vehicle in response to the three dimensional object.

Embodiment 8

The method of any of embodiments 1 to 7, further comprising:
  storing the three dimensional object in a map.

Embodiment 9

The method of any of embodiments 1 to 8, wherein the point cloud is analyzed by the learned model from a feed of data from a distancing system.

Embodiment 10

The method of any of embodiments 1 to 9, wherein the feed of data includes a first dimension based on a size of a sensor array of the distancing system and a second dimension based on a scan of the sensor array.

Embodiment 11

The method of any of embodiments 1 to 10, wherein the three dimensional object is a pole.

Embodiment 12

An apparatus, configured to perform and/or control the method of any of embodiments 1-11 or comprising means for performing and/or controlling any of embodiments 1-11.

Embodiment 13

An apparatus, comprising at least one processor and at least one memory including computer program code for one or more programs, the at least one memory and the computer program code configured to, with the at least one processor, to perform and/or control the method of any of embodiments 1-11.

Embodiment 14

A computer program comprising instructions operable to cause a processor to perform and/or control the method of any of embodiments 1-11, when the computer program is executed on the processor.

We claim:

1. A method for segmentation of three dimensional objects, the method comprising:
  identifying point cloud data for a geographic region;
  analyzing the point cloud data with a learned model;
  assigning probability values outputted from the learned model to points in the point cloud data;
  clustering the probability values based on relative locations of the assigned points in the point cloud data;
  generating a matrix with at least a portion of the clustered probability values;
  factoring the matrix to assign a line for a three dimensional object of the geographic region; and
  fitting at least one predetermined shape for the three dimensional object to the point cloud data based at least on the assigned line.

2. The method of claim 1, further comprising:
  calculating a first centroid for a top portion of the three dimensional object; and
  calculating a second centroid for a bottom portion of the three dimensional object.

3. The method of claim 2, wherein the at least one predetermined shape for the three dimensional object is selected based on the first centroid and the second centroid.

4. The method of claim 1, further comprising:
  calculating a first radius and a second radius from the matrix with at least a portion of the clustered probability values.

5. The method of claim 1, further comprising:
  providing coordinates for the predetermined shape in the point cloud data to an external device.

6. The method of claim 1, further comprising:
  performing a comparison of the three dimensional object to a geographic fingerprint; and
  determining a location based on the comparison.

7. The method of claim 1, further comprising:
  generating a navigation instruction for an aerial vehicle in response to the three dimensional object.

8. The method of claim 1, further comprising:
  storing the three dimensional object in a map.

9. The method of claim 1, wherein the point cloud is analyzed by the learned model from a feed of data from a distancing system.

10. The method of claim 9, wherein the feed of data includes a first dimension based on a size of a sensor array of the distancing system and a second dimension based on a scan of the sensor array.

11. The method of claim 1, wherein the three dimensional object is a pole.

12. An apparatus for segmentation of three dimensional objects, the apparatus comprising:
  a neural network model configured to analyze point cloud data for a geographic region and assign probability values outputted from the neural network to points in the point cloud data;
  a clustering module configured to group a subset of the probability values based on relative locations of the assigned points in the point cloud data;
  a factorization module configured to factor a matrix with the subset of the clustered probability values to assign a line for a three dimensional object of the geographic region; and
  a geometric fitting module configured to fit at least one predetermined shape for the three dimensional object to the point cloud data based at least on the assigned line.

13. The apparatus of claim 12, further comprising:
  an annotation engine configured to associate user inputs with ground truth values for one or more three dimensional objects, wherein the neural network model.

14. The apparatus of claim 12, further comprising:
  a geographic database configured to store the three dimensional object at a location based on collection of the point cloud.

15. The apparatus of claim 12, wherein the geometric fitting module is configured to calculate a first centroid for a top portion of the three dimensional object and calculate a second centroid for a bottom portion of the three dimensional object.

16. The apparatus of claim 15, wherein the at least one predetermined shape for the three dimensional object is selected based on the first centroid and the second centroid.

17. The apparatus of claim 12, wherein the factorization module is configured to calculate a first radius and a second radius from the matrix with at least a portion of the clustered probability values.

18. The apparatus of claim 12, further comprising:
a communication device configured to provide coordinates for the predetermined shape in the point cloud data to an external device.

19. A non-transitory computer readable medium including instructions that when executed are configured to cause a processor to perform:
analyzing point cloud data with a learned model that outputs probability values for points in the point cloud data;
performing a clustering algorithm based on the probability values for the points in the point cloud data and based on relative locations of the points in the point cloud data;
calculating at least one characteristic of the clustered probability values;
calculating a geometry from the at least one characteristic; and
fitting at least one predetermined shape for a pole to the geometry.

20. The non-transitory computer readable medium of claim 19, instructions when executed are configured to cause the processor to perform:
providing object coordinates for the at least one predetermined shape to an external device to provide the geographic location for the pole.

* * * * *